(12) United States Patent
Saad et al.

(10) Patent No.: US 8,899,903 B1
(45) Date of Patent: Dec. 2, 2014

(54) VEHICLE BASE STATION

(75) Inventors: Emad W. Saad, Renton, WA (US); John L. Vian, Renton, WA (US); Matthew A. Vavrina, Seattle, WA (US); Jared A. Nisbett, Saint James, MO (US); Donald C. Wunsch, Rolla, MO (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 12/782,525

(22) Filed: May 18, 2010

(51) Int. Cl.
*B65G 67/00* (2006.01)

(52) U.S. Cl.
USPC .......................................... 414/392; 320/109

(58) Field of Classification Search
USPC ..................... 104/34; 320/109; 414/390–392, 414/395–396
See application file for complete search history.

(56) References Cited

U.S. PATENT DOCUMENTS

| | | | |
|---|---|---|---|
| 755,087 A * | 3/1904 | Ward ............................... | 104/34 |
| 4,450,400 A * | 5/1984 | Gwyn ........................... | 320/109 |
| 5,091,687 A * | 2/1992 | Meyer et al. ................... | 320/109 |
| 5,301,765 A * | 4/1994 | Swanson ....................... | 180/68.5 |
| 5,612,606 A | 3/1997 | Guimarin et al. | |
| 5,668,460 A * | 9/1997 | Lashlee et al. ................. | 320/109 |
| 5,760,569 A * | 6/1998 | Chase, Jr. ....................... | 320/104 |
| 5,909,100 A * | 6/1999 | Watanabe et al. ............. | 320/108 |
| 5,951,229 A * | 9/1999 | Hammerslag ................. | 414/398 |
| 5,998,963 A * | 12/1999 | Aarseth ......................... | 320/109 |
| 6,014,597 A * | 1/2000 | Kochanneck ................... | 701/22 |
| 6,813,257 B1 | 11/2004 | Emmons, Jr. et al. | |
| 7,489,926 B2 | 2/2009 | Whelan et al. | |
| 8,164,300 B2 | 4/2012 | Agassi et al. | |
| 8,164,302 B2 | 4/2012 | Capizzo | |
| 8,183,821 B2 | 5/2012 | Sakurai | |
| 2007/0113921 A1* | 5/2007 | Capizzo ......................... | 141/231 |
| 2008/0006459 A1* | 1/2008 | Niebuhr ........................ | 180/68.5 |
| 2008/0033684 A1 | 2/2008 | Vian et al. | |
| 2009/0212157 A1 | 8/2009 | Arlton et al. | |
| 2009/0299582 A1 | 12/2009 | Anderson | |
| 2010/0145717 A1* | 6/2010 | Hoeltzel ......................... | 705/1.1 |
| 2012/0123628 A1 | 5/2012 | Duggan et al. | |

FOREIGN PATENT DOCUMENTS

WO    WO 2008128991 A1 * 10/2008

* cited by examiner

*Primary Examiner* — Jonathan Snelting
(74) *Attorney, Agent, or Firm* — Toler Law Group, PC

(57) ABSTRACT

A system to load and unload material from a vehicle comprises a vehicle base station and an assembly to autonomously load and unload material from the vehicle.

14 Claims, 10 Drawing Sheets

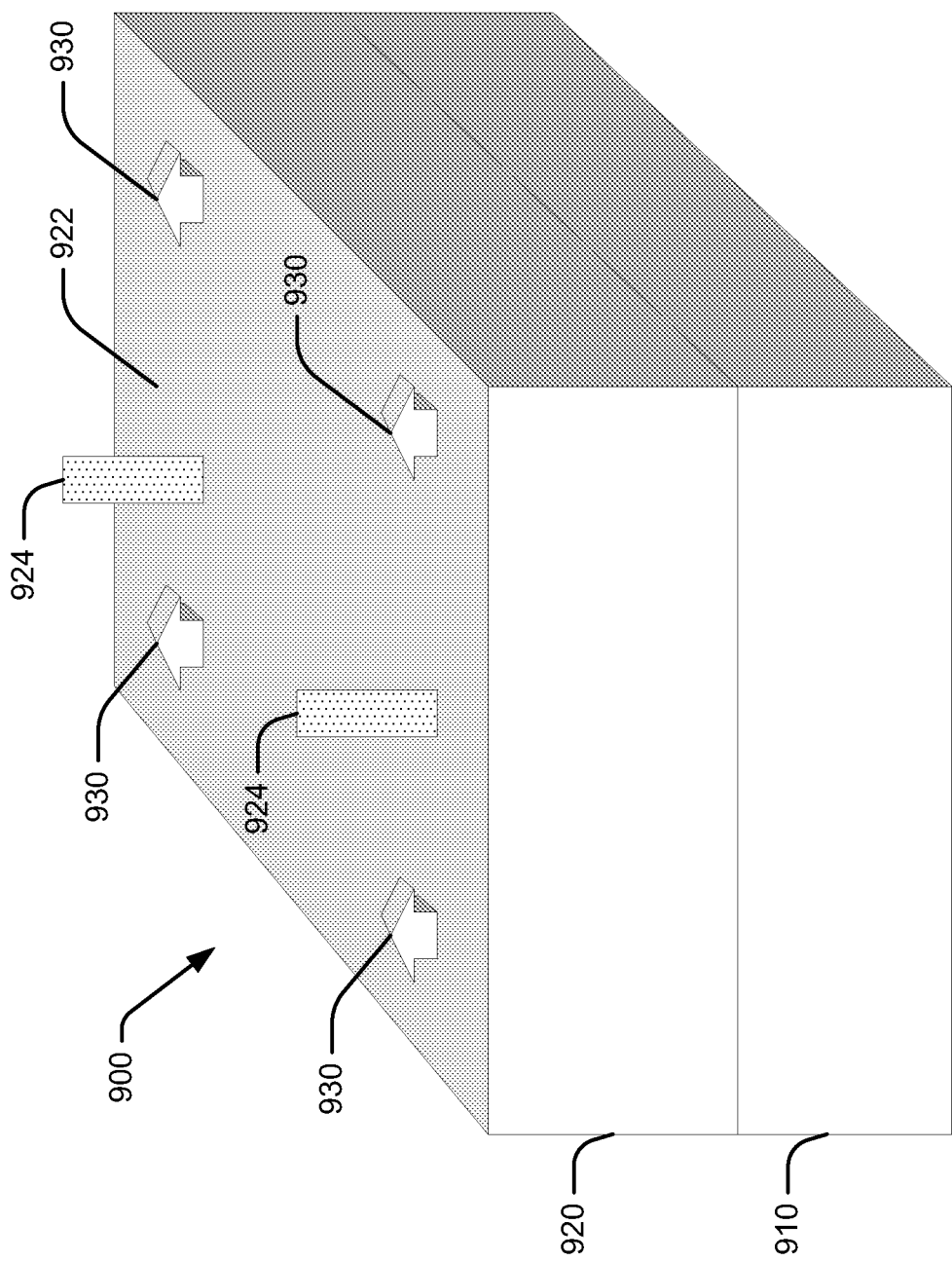

VEHICLE BASE STATION

RELATED APPLICATIONS

None

BACKGROUND

The subject matter described herein relates to vehicle base stations, and more particularly to a vehicle base station that includes a platform for loading material on one or more autonomous vehicles such as an unmanned aerial vehicle (UAV) or the like.

Autonomous vehicles have found increased utility in industrial, law enforcement, and military applications. Examples of autonomous vehicles include drone aircraft and robotic vehicles. Some autonomous vehicles are powered, at least in part, by batteries. Thus, battery power provides a meaningful limitation on the ability to use autonomous vehicles in a persistent fashion, particularly in remote locations. Accordingly, systems and methods to enable autonomous vehicles to remove batteries or other payload and reload fresh batteries or other payload may find utility.

BRIEF DESCRIPTION OF THE DRAWINGS

The detailed description is described with reference to the accompanying figures.

FIG. 9A is a perspective view of a modular battery pack according to embodiments.

SUMMARY

Figure 1:
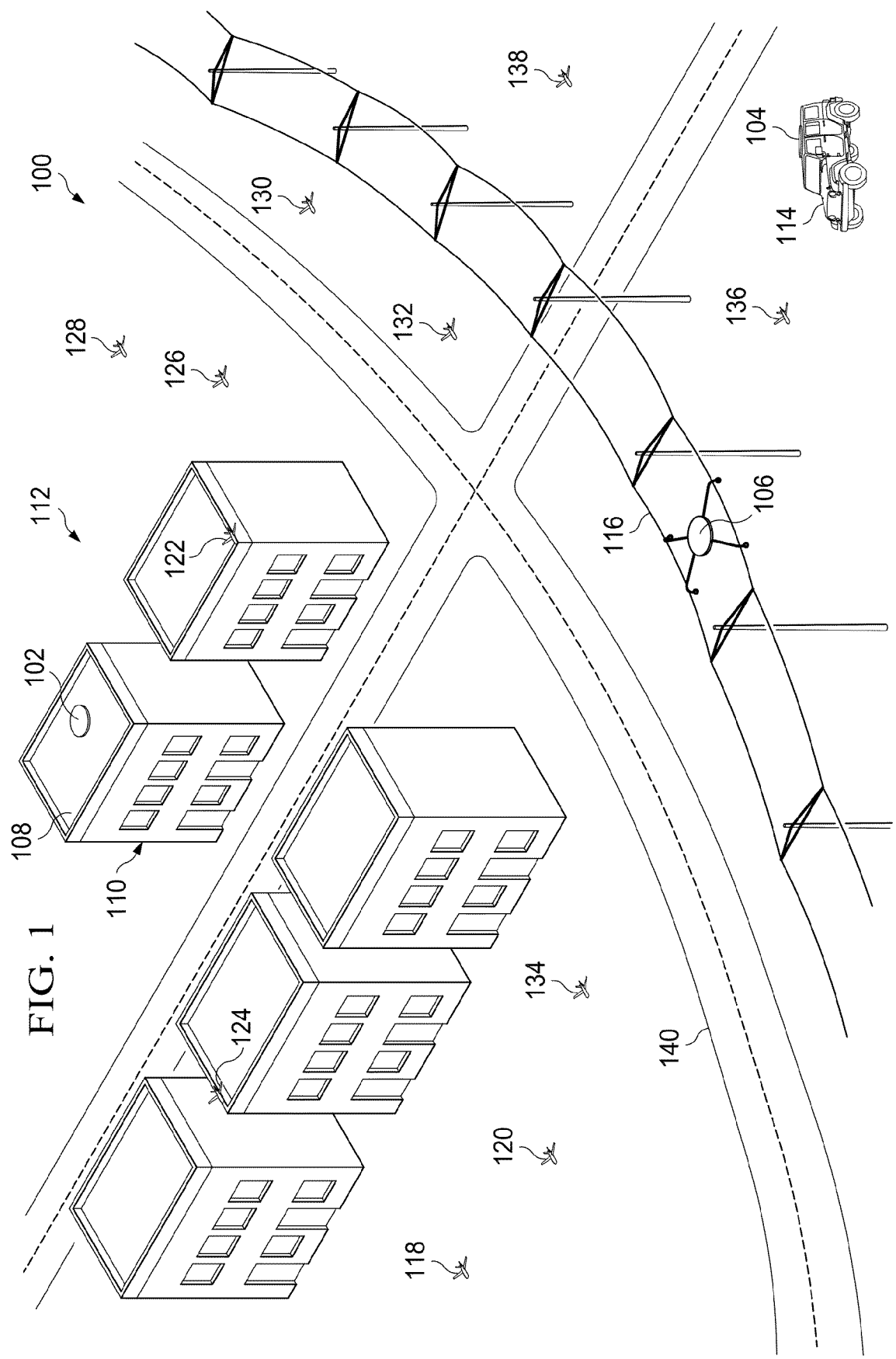
FIG. 1 is an illustration of an unmanned aerial vehicle environment in accordance with an embodiment.

Described herein is an exemplary system to load and unload material from a vehicle. In some embodiments the system comprises a vehicle base station and an assembly to autonomously load and unload material from the vehicle.

In another embodiment a method to replace a first payload on a vehicle comprises positioning the vehicle on a platform of a vehicle base station such that the first payload is aligned with an aperture in the platform, aligning an empty docking station in a payload advancing assembly with the aperture, removing the first payload from the vehicle, placing the first payload in the empty docking station of the payload advancing assembly, advancing the payload advancing assembly to align a full docking station with the aperture, and securing a second payload to the vehicle.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and elements have not been illustrated or described in detail so as not to obscure the particular embodiments.

One embodiment of a vehicle loading platform will be described with reference to an unmanned aerial vehicle (UAV) environment. An unmanned aerial vehicle (UAV) is an aircraft that is capable of flying without human operators being present in the aircraft. Unmanned aerial vehicles may be controlled from a remote location. At this remote location, a human operator or a program executed by a computer generates commands for the unmanned aerial vehicle. Unmanned aerial vehicles also may be controlled using a program running on a computer or other controller on the unmanned aerial vehicle.

Unmanned aerial vehicles are used for a number of different purposes. In military and security applications, unmanned aerial vehicles may be used to perform missions that may include, for example, without limitation, reconnaissance missions, attack missions, and/or other suitable types of missions. Unmanned aerial vehicles also may be used in a number of civilian applications. For example, without limitation, unmanned aerial vehicles may be used to perform surveying, firefighting, and/or other suitable types of missions.

Unmanned aerial vehicles may come in a number of different sizes and shapes. Unmanned aerial vehicles may, for example, take the form of fixed wing aircraft, helicopters, and/or ornithopters. For example, without limitation, an unmanned aerial vehicle may take the form of an airplane, a helicopter, or some other suitable type of device capable of flying. The size of an unmanned aerial vehicle may vary greatly. For example, an unmanned aerial vehicle may have a wing span from about a few inches to about 200 feet, depending on the type of unmanned aerial vehicle.

Smaller unmanned aerial vehicles are referred to as micro air vehicles. These types of air vehicles may be configured to be carried by a person and may be launched by throwing the micro air vehicles in the air. The small size of these types of air vehicles allows this type of launching method to provide sufficient velocity for these air vehicles to begin flight. The size of unmanned aerial vehicles has been reduced in part because of a reduction in the sizes of sensors, motors, power supplies, and controllers for these types of vehicles.

Reductions in vehicle size and cost make it possible to operate these vehicles in large numbers. For example, micro air vehicles (MAVs) may be operated in numbers that are about the size of a squad or platoon, as compared to operating one or two larger unmanned aerial vehicles. This type of operation increases the monitoring that can be performed for a particular area. These types of unmanned aerial vehicles also may land on a perch, a building, or another location. In this manner, a micro air vehicle may monitor a particular location without having to continue flight. The micro air vehicle may be repositioned if the area of interest changes.

For example, a micro air vehicle may land on a building in a city or town. The micro air vehicle may monitor a particular road or building in the city. Micro air vehicles, however, have limitations with their smaller size, as compared to larger unmanned aerial vehicles. For example, the processing power and data transmission ranges may be more limited for micro air vehicles, as compared to larger unmanned aerial vehicles. Further, the range of these micro air vehicles may be shorter, as compared to the larger unmanned aerial vehicles.

Various embodiments described herein provide a vehicle base station for autonomous vehicles including unmanned aerial vehicles. In some embodiments, a base station comprises a housing defining at least one platform to support at least one vehicle carrying a payload, a vehicle docking assembly to align the payload at a desired location on the platform, and a payload replacement assembly to remove the payload from the vehicle and to replace the payload with a new payload. Various aspects of embodiments of vehicle base stations and unmanned aerial vehicles will be explained with reference to the figures, below.

With reference to FIG. 1, an illustration of an unmanned aerial vehicle environment is depicted in accordance with an embodiment. Unmanned aerial vehicle environment 100 includes unmanned aerial vehicle base station 102, unmanned aerial vehicle base station 104, and unmanned aerial vehicle base station 106.

In the example depicted in FIG. 1, unmanned aerial vehicle base station 102 is located on rooftop 108 of building 110 within a town 112. Unmanned aerial vehicle base station 104 is associated with vehicle 114. A first component may be considered to be associated with a second component by being secured to the second component, bonded to the second component, fastened to the second component, and/or connected to the second component in some other suitable manner. The first component also may be connected to the second component by a third component. The first component may be considered to be associated with the second component by being formed as part of and/or an extension of the second component.

Unmanned aerial vehicle base station 106 is located on power lines 116. Unmanned aerial vehicle base stations 102, 104, and 106 may be deployed in a number of different ways. Unmanned aerial vehicle base station 102 may be dropped off by helicopter on rooftop 108. The location of unmanned aerial vehicle base station 102 on rooftop 108 may result in unmanned aerial vehicle base station 102 being less observable. Further, this location may provide a better line of sight between unmanned aerial vehicle base station 102 and communication arrays. In this manner, the range at which unmanned aerial vehicle base station 102 may communicate with unmanned aerial vehicles may be increased.

Unmanned aerial vehicle base station 104 is associated with vehicle 114. By being associated with vehicle 114, unmanned aerial vehicle base station 104 may be moved periodically or constantly. This type of deployment may reduce the discoverability of unmanned aerial vehicle base station 104. Further, by providing mobility to unmanned aerial vehicle base station 104, greater flexibility may be present for performing missions. In addition, unmanned aerial vehicle base station 104 may be removed from vehicle 114 and placed on the ground or in some other suitable location.

Unmanned aerial vehicle base station 106 may be deployed onto power lines 116 by being dropped by a helicopter, on a parachute, or some other suitable mechanism. Unmanned aerial vehicle base station 106 may be less observable on power lines 116. As depicted, unmanned aerial vehicles, such as unmanned aerial vehicles 118, 120, 122, 124, 126, 128, 130, 132, 134, 136, and 138 may operate from unmanned aerial vehicle base stations 102, 104, and 106.

In these illustrative examples, unmanned aerial vehicle base stations 102, 104, and 106 provide a base from which the different unmanned aerial vehicles may transmit data, receive instructions, recharge, be stored, and/or perform other operations.

Additionally, unmanned aerial vehicles may travel from base station to base station. In other words, unmanned aerial vehicle base stations 102, 104, and 106 may provide a network to extend the range of unmanned aerial vehicles. Having multiple unmanned aerial vehicle base stations also may provide backup in case one unmanned aerial vehicle base station malfunctions or fails to perform as needed.

As can be seen in this depicted example, unmanned aerial vehicle base stations 102, 104, and 106 may be placed in locations where detection of those base stations may be reduced. These locations may include other locations other than those illustrated in this particular example. For example, unmanned aerial vehicle base stations 102, 104, and 106 may be placed in trees, in brush, and/or in other suitable locations.

The unmanned aerial vehicles may be used to perform a number of different missions in unmanned aerial vehicle environment 100. In this illustrative example, the unmanned aerial vehicles may monitor for undesired activity. For example, the undesired activity may be the placement of an improvised explosive device in roadway 140. In another example, the unmanned aerial vehicles may monitor for movement of vehicles or people. In still other examples, unmanned aerial vehicles may be used to monitor for construction of structures.

Figure 2:
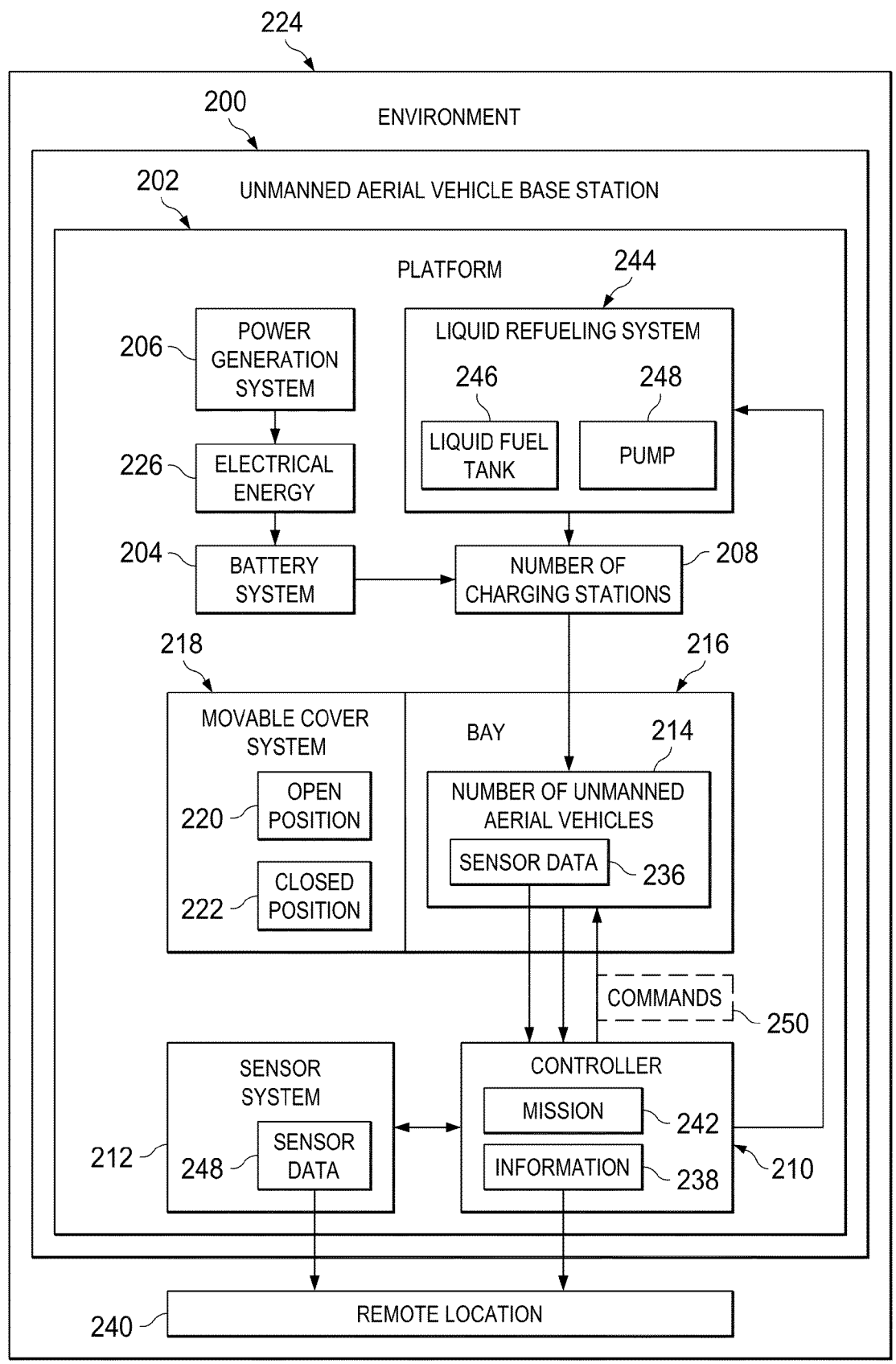
FIG. 2 is a schematic illustration of a block diagram of an unmanned aerial vehicle base station in accordance with an embodiment.

With reference now to FIG. 2, an illustration of a block diagram of an unmanned aerial vehicle base station is depicted in accordance with an advantageous embodiment. Unmanned aerial vehicle base station 200 is an example of an unmanned aerial vehicle base station that may be used to implement unmanned aerial vehicle base stations 102, 104, and 106 in FIG. 1.

In this illustrative example, unmanned aerial vehicle base station 200 comprises platform 202, battery system 204, power generation system 206, number of charging stations 208, controller 210, sensor system 212, and/or other suitable components.

Platform 202 is configured to hold one or more unmanned aerial vehicles 214. In other words, number of unmanned aerial vehicles 214 may be placed in and/or stored in or on platform 202. For example, platform 202 may have bay 216 in which number of unmanned aerial vehicles 214 may land. Bay 216 may be an area of platform 202 surrounded by walls with an opening on the top side of platform 202. In other advantageous embodiments, bay 216 may have walls and a roof with an opening on the side of platform 202. An unmanned aerial vehicle is considered to be housed when the unmanned aerial vehicle enters into or lands on platform 202.

Additionally, platform 202 may be configured to provide protection from environment 224 for number of unmanned aerial vehicles 214 when number of unmanned aerial vehicles 214 is housed in platform 202.

Platform 202 also may have movable cover system 218 that is configured to move between open position 220 and closed position 222. Movable cover system 218 may cover bay 216. When movable cover system 218 is in open position 220, number of unmanned aerial vehicles 214 may take off from and/or land in or on platform 202.

When movable cover system 218 is in closed position 222, number of unmanned aerial vehicles 214 located in bay 216 of platform 202 may be protected from environment 224. Further, closed position 222 also provides a configuration for transporting number of unmanned aerial vehicles 214 in unmanned aerial vehicle base station 200.

Battery system 204 and power generation system 206 provide electrical energy 226 for unmanned aerial vehicle base station 200 and number of unmanned aerial vehicles 214. Battery system 204 is optional and stores electrical energy 226 generated by power generation system 206. Power generation system 206 generates electrical energy 226 from environment 224 in which unmanned aerial vehicle base station 200 is located.

A number of charging stations 208 are connected to battery system 204. Charging stations 208 are configured to charge batteries for a number of unmanned aerial vehicles 214 using electrical energy 226. Further, charging stations 208 provide electrical energy 226 to controller 210 and sensor system 212 in unmanned aerial vehicle base station 200.

In some embodiments, aerial vehicles 214 may take the form of liquid fueled unmanned aerial vehicles. In these illustrative examples, charging stations 208 is configured to refuel these liquid fueled unmanned aerial vehicles. For example, unmanned aerial vehicle base station 200 may have liquid refueling system 244. Liquid refueling system 244 has liquid fuel tank 246 containing liquid fuel. The liquid fuel may be, for example, gasoline or diesel fuel. Pump 248 in liquid refueling system 244 transfers the liquid fuel in liquid fuel tank 246 to number of charging stations 208. Charging stations 208 may be configured to provide liquid fuel to the liquid fuel unmanned aerial vehicles.

In these embodiments, controller 210 may be configured to control the pumping of liquid fuel from liquid refueling system 244. In some embodiments, liquid refueling system 244 may deliver liquid fuel to one or more unmanned aerial vehicles 214 at number of charging stations 208 using a syringe injection system.

In these embodiments, controller 210 may be configured to receive sensor data 236 from number of unmanned aerial vehicles 214. Additionally, controller 210 may be configured to generate information 238 from sensor data 236. Information 238 may then be sent to remote location 240. Remote location 240 is a location remote to unmanned aerial vehicle base station 200. The remote location may include a mission planning system or a human operator. Controller 210 may also be configured to program each of number of unmanned aerial vehicles 214 with mission 242. Mission 242 may be the same or different for each of number of unmanned aerial vehicles 214.

Sensor system 212 generates sensor data 248 from environment 224. Sensor data 248 may be sent to remote location 240 or may be used to send commands 250 to number of unmanned aerial vehicles 214.

The illustration of unmanned aerial vehicle base station 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different embodiments.

For example, in some embodiments, different forms of energy may be stored in storage devices for conversion into electrical energy for number of unmanned aerial vehicles 214. These storage devices may be devices other than battery system 204. These devices may include, for example, without limitation, capacitors, flywheels, compressed air devices, and/or other suitable energy storage devices. One or more of these devices may be connected to charging stations 208. In some embodiments a base station may comprise a system to replace a battery pack (or other payload) on a vehicle. Further, a base station may comprise an assembly to recharge one or more batteries. Embodiments of such base station are described below with reference to FIGS. 8A and 8B.

Figure 3:
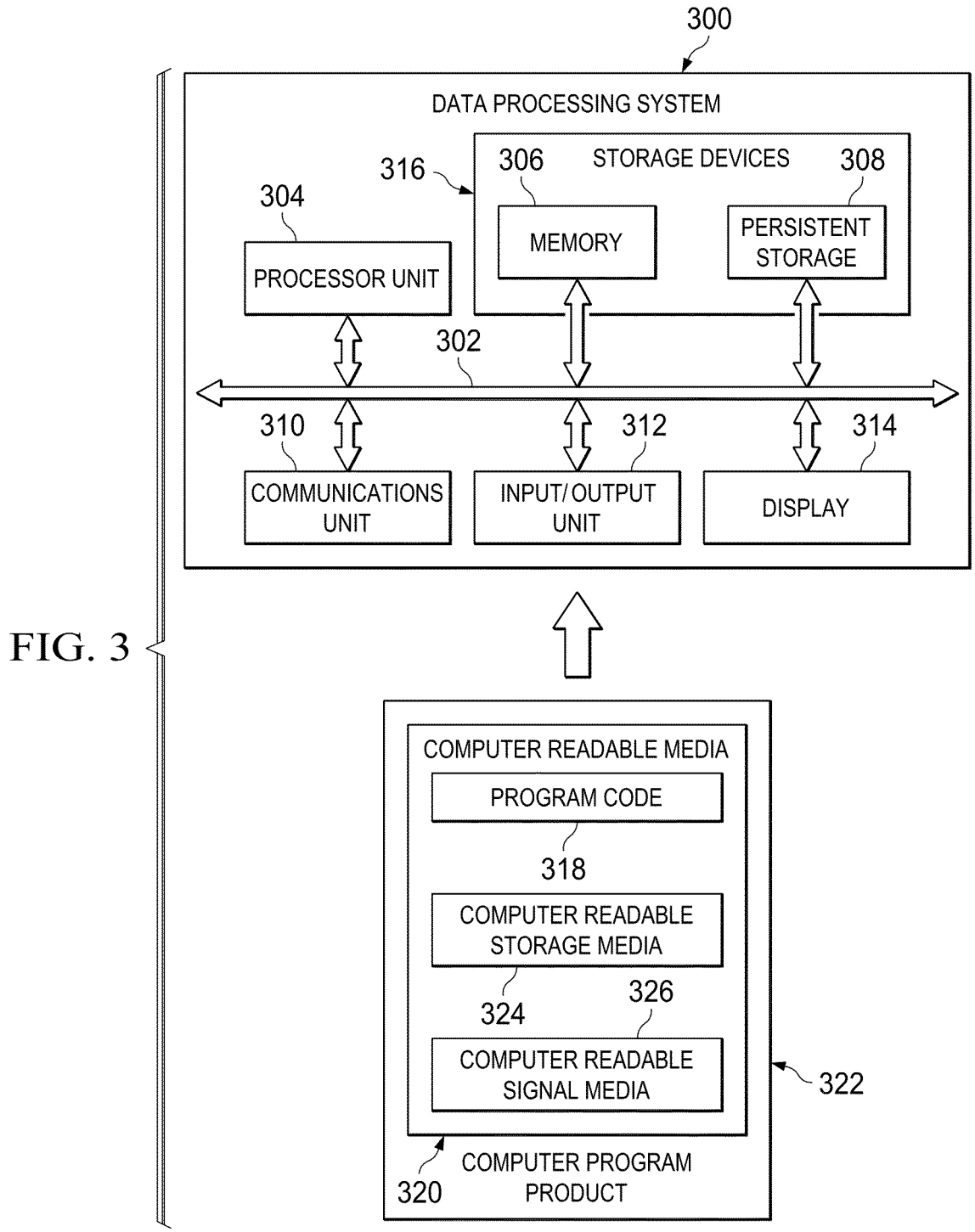
FIG. 3 is a schematic illustration of a block diagram of a data processing system in accordance with an embodiment.

Turning to FIG. 3, an illustration of a block diagram of a data processing system is depicted in accordance with an embodiment. Data processing system 300 is an example of an implementation for controller 210 in FIG. 2. In this illustrative example, data processing system 300 includes communications fabric 302, which provides communications between processor unit 304, memory 306, persistent storage 308, communication unit 310, and input/output (I/O) unit 312.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device.

Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communication unit 310, in these examples, provides for communication with other data processing systems or devices. In these examples, communications unit 310 is a network interface card. Communications unit 310 may provide communications through the use of either or both physical and wireless communications links.

Communications unit 310 is configured to provide wireless communications links. These wireless communications links may include, for example, without limitation, a satellite communications link, a microwave frequency communications link, a radio frequency communications link, and/or other suitable types of wireless communication links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326.

Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communication links, such as wireless communications links, an optical fiber cable, a coaxial cable, a wire, and/or any other suitable type of communication link. In other words, the communication link and/or the connection may be physical or wireless in the illustrative examples.

In some embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system, including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
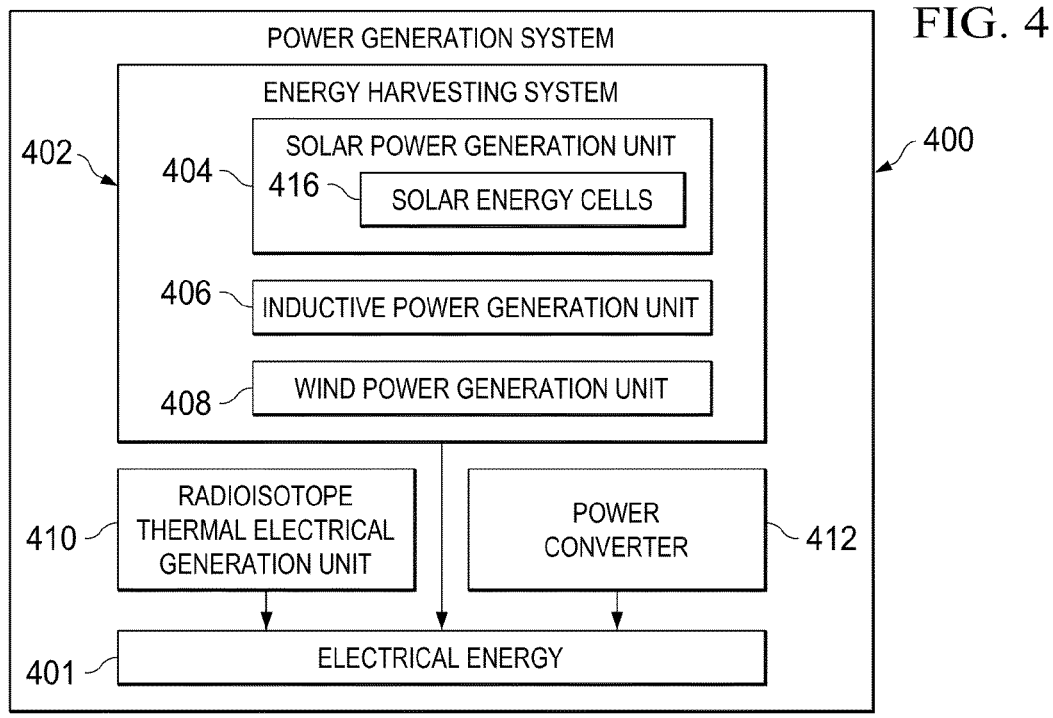
FIG. 4 is an illustration of a block diagram of a power generation system in accordance with an embodiment.

With reference to FIG. 4, an illustration of a block diagram of a power generation system is depicted in accordance with an advantageous embodiment. Power generation system 400 is an example of one implementation for power generation system 206 in FIG. 2. Power generation system 400 generates electrical energy 401 in these illustrative examples.

Power generation system 400 may include energy harvesting system 402. Energy harvesting system 402 may comprise at least one of solar power generation unit 404, inductive power generation unit 406, wind power generation unit 408, and/or other suitable types of energy harvesting units. Power generation system 400 also may include radioisotope thermal electrical generation unit 410, power converter 412, and/or other suitable types of power generation devices, e.g., fuel cells, batteries, electric generators, or electric outlets.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Solar power generation unit 404 generates electrical energy 401 from exposure to sunlight or other light in the environment. Solar power generation unit 404 may comprise solar energy cells 416. In the different illustrative examples, solar energy cells 416 may take the form of photovoltaic units. Solar energy cells 416 may be located on, for example, without limitation, movable cover system 218 in FIG. 2.

Inductive power generation unit 406 generates power inductively when an alternating current source is present, such as in power lines. This power may be used to provide electrical energy 401. Wind power generation unit 408 may include a number of wind power turbines that generate electrical energy 401 from wind that may be present in the environment.

Radioisotope thermal electrical generation unit 410 generates electrical energy 401 from radioactive material that decays. The decay of the radioactive material generates heat used by radioisotope thermal electrical generation unit 410 to generate electrical energy 401. This radioactive material is carried by the unmanned aerial vehicle base station in these examples.

Power converter 412 converts electrical power from one form to another form. For example, power converter 412 may convert alternating current (AC) energy into direct current (DC) energy. Power converter 412 also may change the frequency of alternating current energy as another example. In yet another example, power converter 412 may change the current flow. Power converter 412 may be used when a power source, such as an electrical outlet, is present. In these illustrative examples, power converter 412 converts energy into electrical energy 401 for use by an unmanned aerial vehicle.

Figure 5:
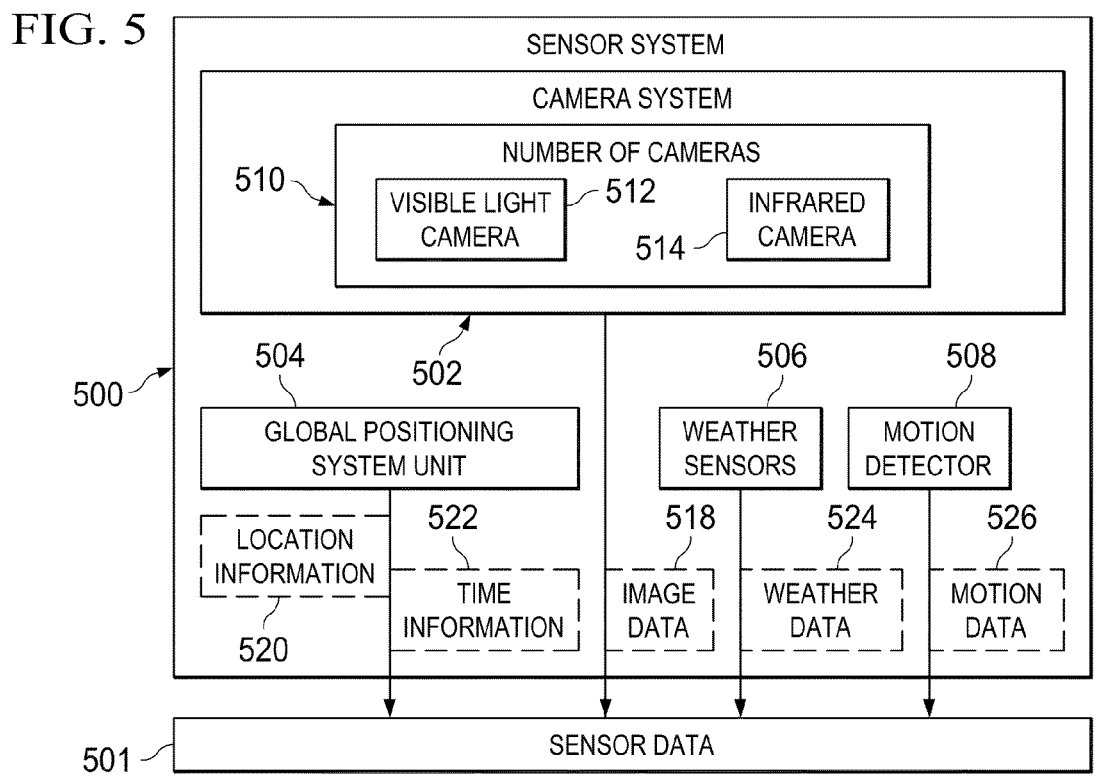
FIG. 5 is an illustration of a block diagram of a sensor system in accordance with an embodiment.

Referring now to FIG. 5, an illustration of a block diagram of a sensor system is depicted in accordance with an advantageous embodiment. Sensor system 500 is an example of one implementation for sensor system 212 in FIG. 2. In these illustrative examples, sensor system 500 generates sensor data 501. Sensor system 500, in this example, includes camera system 502, global positioning system unit 504, weather sensors 506, and motion detector 508.

Camera system 502 may comprise number of cameras 510. Cameras 510 may include at least one of visible light camera 512, infrared camera 514, and other suitable types of cameras. In some advantageous embodiments, visible light camera 512 and infrared camera 514 are combined as part of a multispectral camera.

Camera system 502 generates sensor data 501 in the form of image data 518. Global positioning system unit 504 generates location information 520 in sensor data 501. Location information 520 may include, for example, latitude, longitude, and an elevation. Additionally, time information 522 also may be generated by global positioning system unit 504.

Weather sensors 506 generate weather data 524 in sensor data 501 that may be used to identify weather conditions. For example, weather sensors 506 may generate information about wind speed, pressure, wind direction, humidity, temperature, and/or other suitable information.

Motion detector 508 generates motion data 526 in sensor data 501. Motion detector 508 generates motion data 526 when motion in an area monitored by motion detector 508 is detected.

Figure 6:
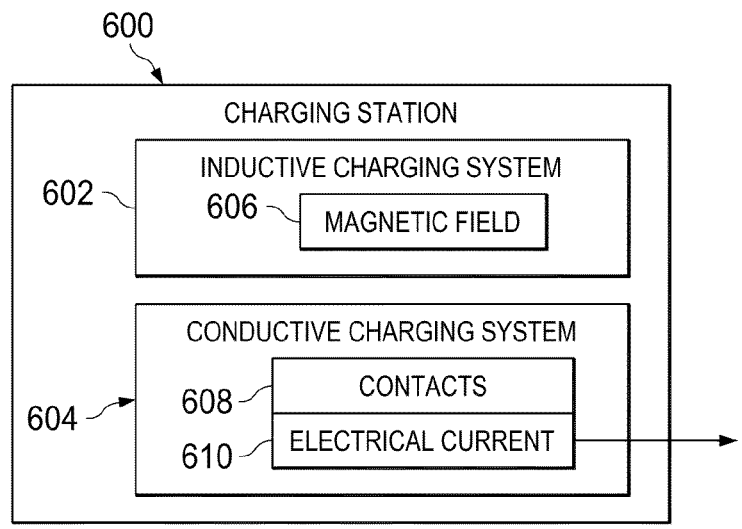
FIG. 6 is an illustration of a block diagram of a charging station in accordance with an embodiment.

Turning now to FIG. 6, an illustration of a block diagram of a charging station is depicted in accordance with an advantageous embodiment. Charging station 600 is an example of an implementation for a charging station within number of charging stations 208 in FIG. 2.

Charging station 600 may comprise at least one of inductive charging system 602 and conductive charging system 604. Inductive charging system 602 generates magnetic field 606. Magnetic field 606 may induce another magnetic field in a coil located within the device being charged. In this manner, the current may be caused to flow in the device being charged without contact between inductive charging system 602 and the device.

Conductive charging system 604 includes contacts 608. Contacts 608 may be placed in physical contact with contacts on the device being charged. This contact allows for electrical current 610 to flow from conductive charging system 604 to the device being charged by charging station 600. In this manner, the device may be charged and/or recharged to perform additional operations or missions.

Figure 7:
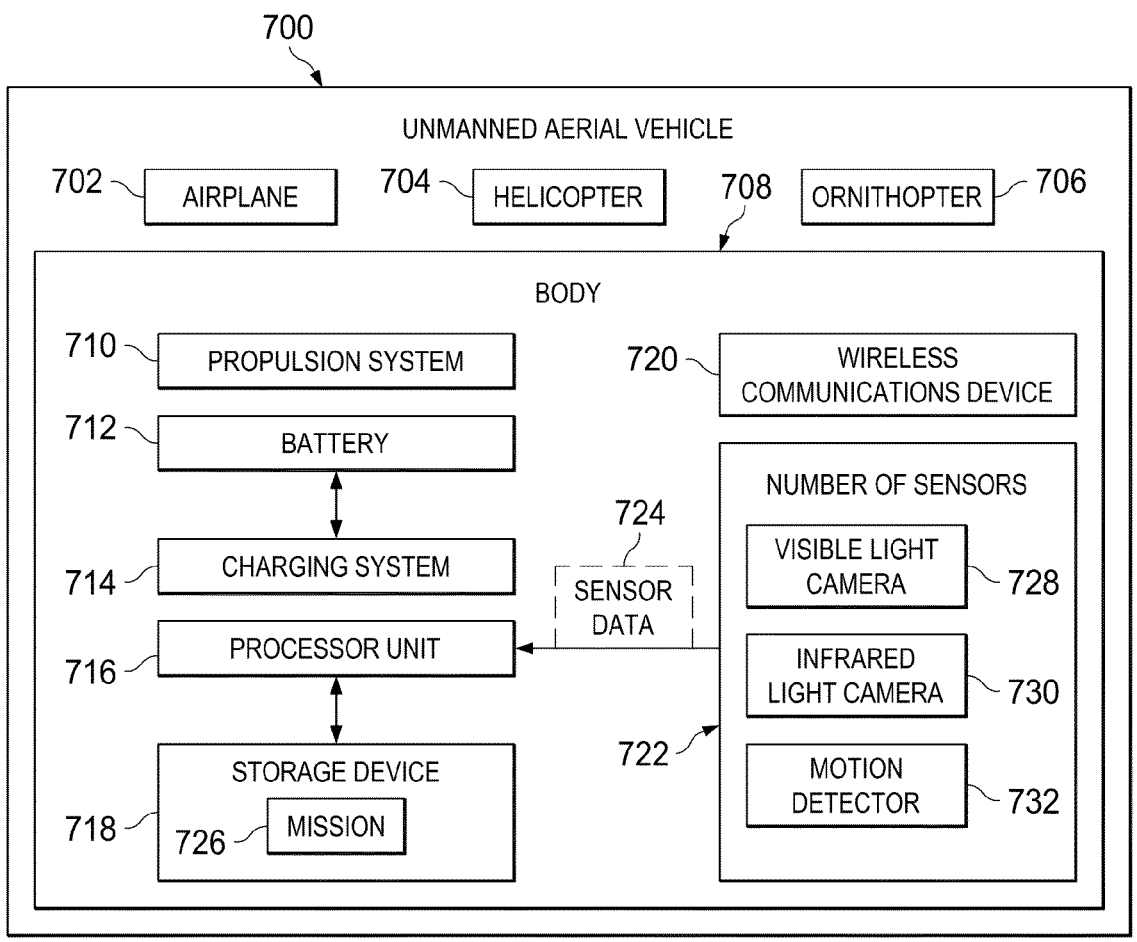
FIG. 7 is an illustration of a block diagram of an unmanned aerial vehicle in accordance with an embodiment.

Turing now to FIG. 7, an illustration of a block diagram of an unmanned aerial vehicle is depicted in accordance with an advantageous embodiment. Unmanned aerial vehicle 700 is an example of one implementation for number of unmanned aerial vehicles 214 in FIG. 2. In some embodiments the vehicles may include manned aerial vehicles or vehicles other than aerial vehicles, e.g., ground vehicles such as cars, trucks, tanks, or the like.

In this illustrative example, unmanned aerial vehicle 700 may take a number of forms. For example, unmanned aerial vehicle 700 may be, for example, without limitation, airplane 702, helicopter 704, ornithopter 706, or some other suitable type of aircraft.

As illustrated, unmanned aerial vehicle 700 comprises body 708, propulsion system 710, battery 712, charging system 714, processor unit 716, storage device 718, wireless communications device 720, and number of sensors 722. Body 708 provides a structure in which the different components of unmanned aerial vehicle 700 may be associated with each other. For example, without limitation, body 708 may be a fuselage. Further, body 708 may include aerodynamic surfaces, such as wings or other types of surfaces.

Propulsion system 710 is configured to move unmanned aerial vehicle 700 in the air. Propulsion system 710 may be, for example, without limitation, an electric motor configured to rotate a propeller or other type of blade. In other advantageous embodiments, propulsion system 710 may be configured to move wings on body 708 when unmanned aerial vehicle 700 takes the form of ornithopter 706. Battery 712 provides electrical energy for unmanned aerial vehicle 700.

Charging system 714 is connected to battery 712 and allows battery 712 to be recharged at a charging station. Charging system 714 may include inductive coils for an inductive charging system or conductive contacts for a conductive charging system. In some advantageous embodiments, charging system 714 also may be used to transfer data. As one illustrative example, charging system 714 may provide a modulated charge as a carrier frequency. This modulated charge allows for the transfer of data in addition to the providing of power.

As another illustrative example, conductive contacts in charging system 714 may be used to transfer data. In other advantageous embodiments, power may be provided wirelessly by charging system 714 using microwaves or a laser.

Processor unit 716 runs a number of programs for missions in these illustrative examples. Storage device 718 may store sensor data 724 generated by sensors 722. Additionally, storage device 718 may store mission 726 that is executed or run by processor unit 716. Mission 726 may be, for example, without limitation, a program, an identification of a target, and/or other suitable types of information.

Wireless communication device 720 is configured to provide communications between unmanned aerial vehicle 700 and a remote location, such as unmanned aerial vehicle base station 200 or remote location 240 in FIG. 2. In these illustrative examples, number of sensors 722 may include, for example, at least one of visible light camera 728, infrared light camera 730, motion detector 732, and/or other suitable types of sensors used to generate sensor data 724 for processing by processor unit 716.

The illustration of unmanned aerial vehicle base station 200 and its components in FIGS. 2-6 and unmanned aerial vehicle 700 in FIG. 7 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some embodiments, unmanned aerial vehicle base station 200 may not include movable cover system 218. Instead, bay 216 may be configured to provide protection from environment 224 without moving parts. For example, bay 216 may be a cavity in platform 202 with an opening configured to protect number of unmanned aerial vehicles 214 from environment 224. Additionally, in some embodiments, unmanned aerial vehicle 700 may not have wireless communications device 720. Instead, a wired contact may be used to transfer data from unmanned aerial vehicle 700 to unmanned aerial vehicle base station 200 when unmanned aerial vehicle 700 lands on platform 202.

In some embodiments a vehicle base station may be adapted to include an assembly for automatically removing a payload from a vehicle and replacing the payload. In embodiments described herein the payload comprises a modular battery case which is selectably attachable to a battery receptacle on the vehicle. Further, the vehicle base station may be adapted to recharge batteries removed from the vehicles.

Figure 8A:
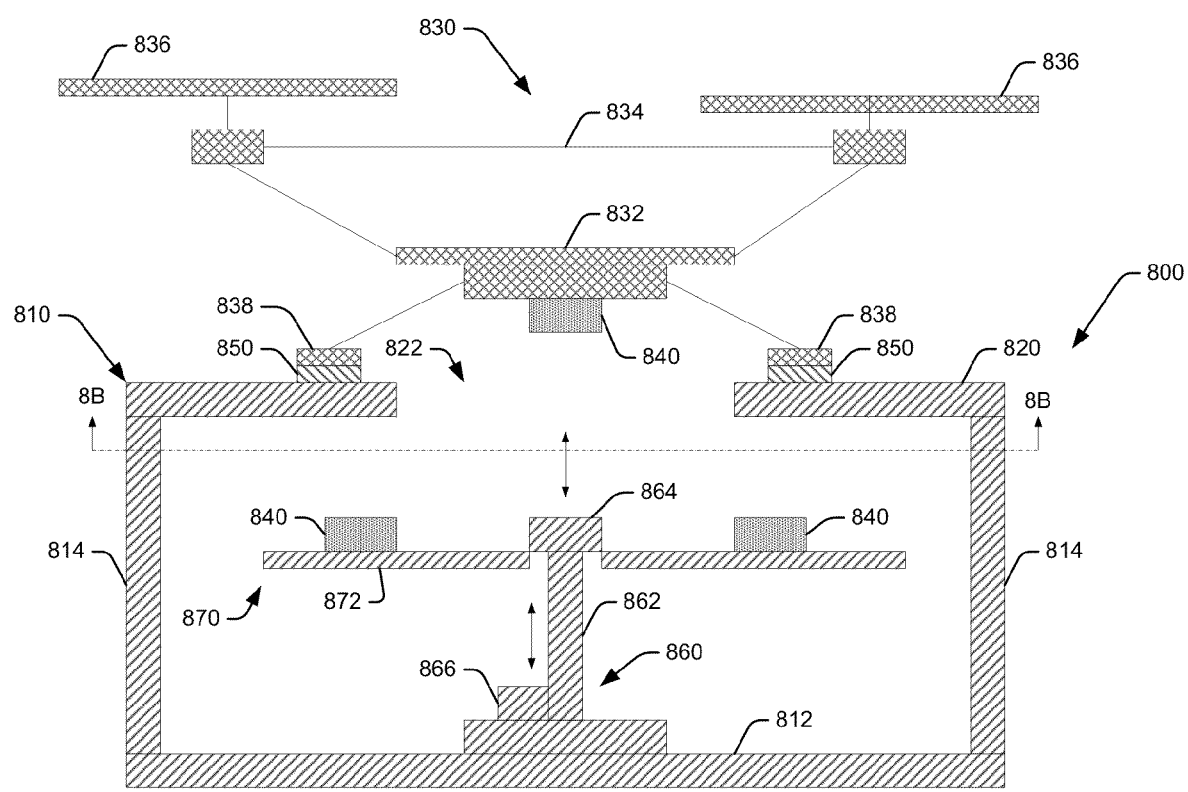
FIG. 8A is an illustration of a side cross-sectional view of a vehicle base station in accordance with embodiments.
Figure 8B:
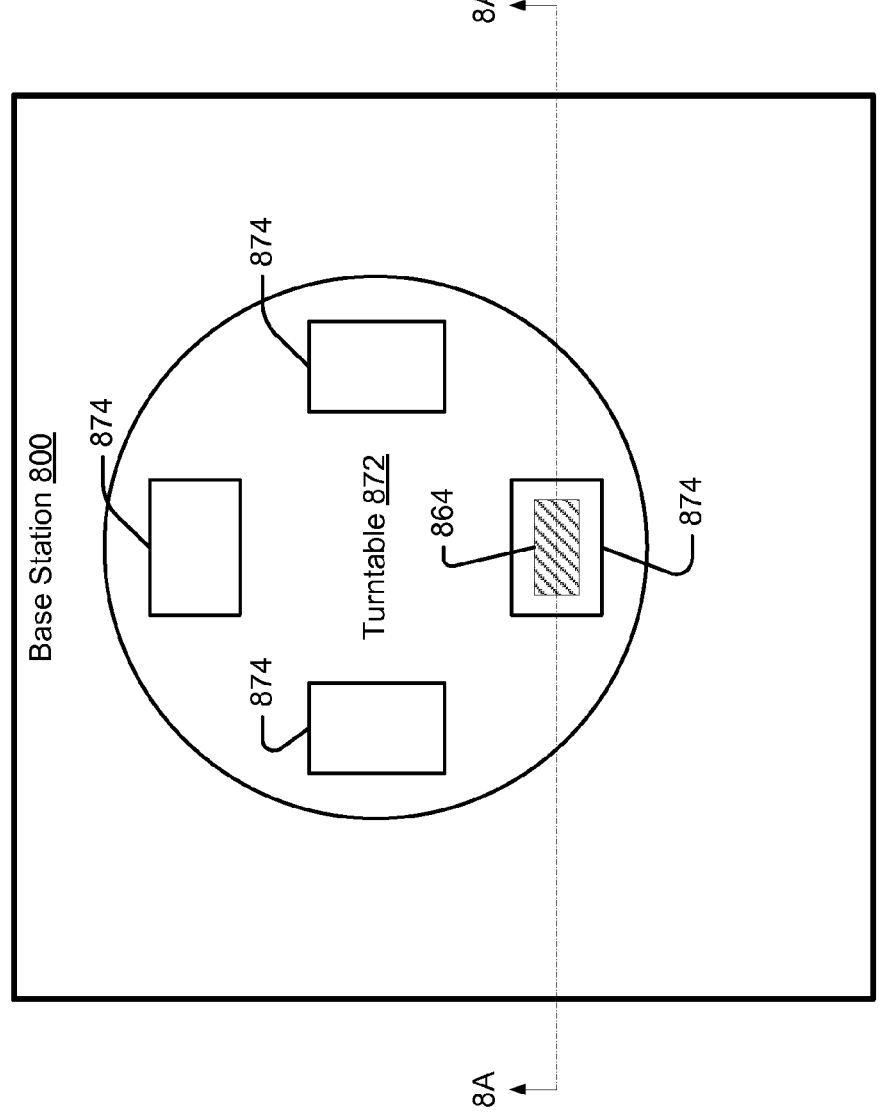
FIG. 8B is an illustration of a top cross-sectional view of a vehicle base station in accordance with embodiments.

One embodiment of a vehicle base station 800 depicted in FIG. 8A and FIG. 8B. FIG. 8A is an illustration of a side cross-sectional view of a vehicle base station 800, and FIG. 8B is an illustration of a top cross-sectional view of a vehicle base station 800 in accordance with embodiments. In some embodiments, a vehicle base station 800 comprises a housing 810 defining at least one platform 820 to support at least one vehicle 830 carrying a payload 840, a vehicle docking assembly 850 to align the payload 840 at a desired location on the platform 820, and a payload replacement assembly 860 to remove the payload 840 from the vehicle 830 and to replace the payload 840 with a new payload 840.

Referring to FIG. 8A and FIG. 8B, in some embodiments the housing 810 comprises a base 812, walls 814 and a platform 820 which define an internal chamber. An aperture 822 in the platform 820 provides access to the internal chamber. The dimensions of the housing 810 are not critical, and may be a function of the size of vehicle 830 for which the housing 810 is adapted. For smaller vehicles such as the micro air vehicles described above the housing may be dimensioned such that it is readily portable. For larger vehicles, e.g., unmanned aerial vehicles or manned aerial vehicles the housing 810 would need to be larger.

A vehicle 830 such as, e.g., an aircraft or an automobile, may be positioned on the platform 820. In the embodiment depicted in FIG. 8A the vehicle 830 is an unmanned aerial vehicle comprising a body 832, a frame structure 834, rotors 836 and supports 838.

In some embodiments a vehicle docking assembly 850 is coupled to the platform 820 to secure the vehicle 820 in an appropriate location above the aperture 822 in the platform. In the embodiment depicted herein the vehicle docking assembly 850 comprises an alignment mechanism to align the vehicle in a predetermined position on the platform. By way of example, the vehicle docking assembly 850 may comprise one or more electromagnetic pads 850 positioned on the surface of the platform 820. When activated, electromagnetic pads 850 generate a magnetic force to secure the supports 838 of the vehicle 830 to the platform 820.

A payload replacement assembly 860 is positioned within the chamber defined by the housing 810. In the embodiment depicted in FIGS. 8A and 8B the payload replacement assembly 860 comprises a hoist assembly 862 which raises a payload platform 864 from a first position, as illustrated in FIG. 8A, in which the payload platform 862 is displaced from a payload 840 to a second position in which the payload platform contacts a payload 840 mounted on the vehicle 830. The hoist assembly 860 may be actuated by a conventional motor 866.

A payload advancing assembly 870 cooperates with the payload replacement assembly to receive a payload 840 from the vehicle 830 and to advance a payload 840 into a position from which the payload may be hoisted onto the vehicle 830.

In the embodiment depicted in FIGS. 8A and 8B the payload advancing assembly comprises a turntable 872 which rotates about a central axis. The platform comprises a plurality of docking stations 874 to hold a payload 840. In some embodiments the docking stations 874 define an aperture in the turntable 872 through which the payload platform 864 may pass when the hoist assembly 860 raises the payload platform 864 to contact the payload 840. Thus, referring to FIG. 8B, the payload platform 864 is visible through the aperture in the docking station 874 of the turntable 872.

While the specific composition of the payload 840 is not critical, in some embodiments the payload 840 may comprise one or more batteries from which the vehicle 830 draws power. In such embodiments the docking stations 874 may comprise or be coupled to a battery charging substation such that batteries removed from the vehicle 830 may be recharged while they are positioned on the turntable 872.

In some embodiments one or more batteries for the vehicle 830 may be stored within a modular battery pack that is adapted to engage with a receptacle that may be coupled to the vehicle 830. FIG. 9A is a perspective view of a modular battery pack 900 according to embodiments. Referring to FIG. 9A, a modular battery pack 900 may comprise a lower portion 910 and an upper portion 920, which define an internal chamber into which one or more batteries may be placed. The upper surface 922 of the upper portion 920 comprises one or more alignment pins 924 and one or more locking anchors 930 which facilitate coupling the battery pack 900 to a receptacle 940 (See FIG. 9B) mounted on the vehicle 830.

Figure 9E:
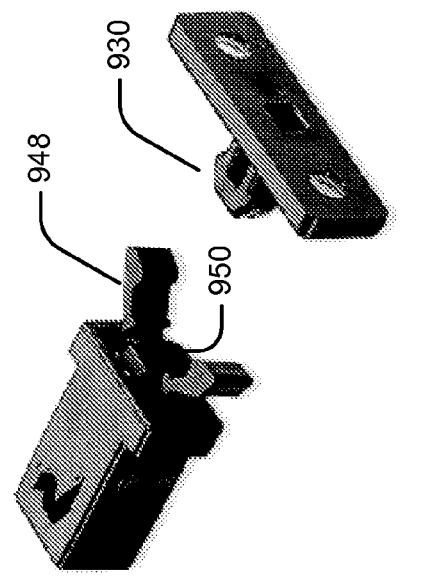
FIG. 9E is a schematic, perspective view of a locking anchor and a locking component, according to embodiments.
Figure 9C:
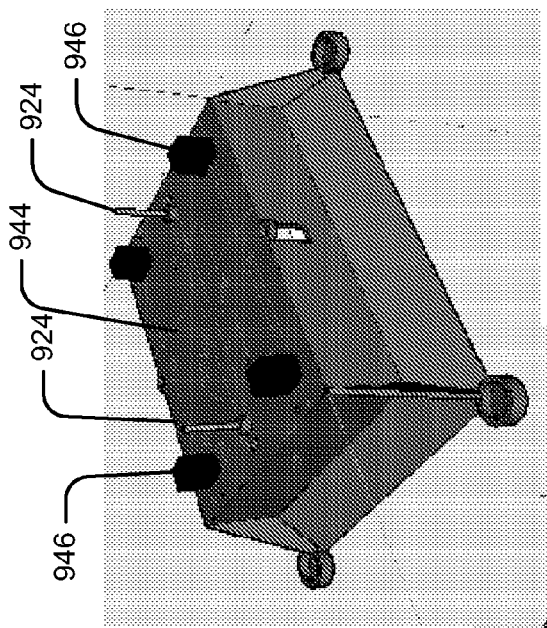
FIGS. 9B-9D are illustrations of perspective views of a modular battery case and a battery receptacle in accordance with embodiments.
Figure 9D:
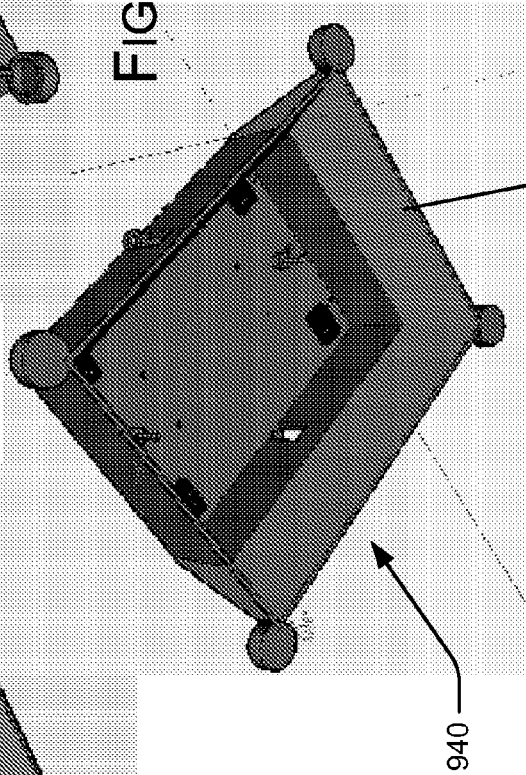
Figure 9B:
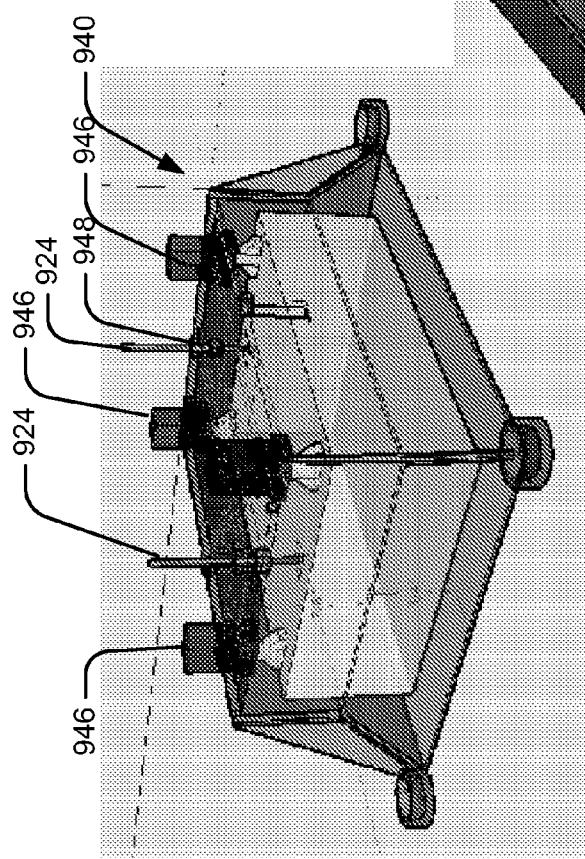

FIGS. 9B-9D are illustrations of perspective views of a modular battery case 900 and a battery receptacle 940 in accordance with embodiments. Referring to FIGS. 9B-9D, the battery receptacle 940 comprises four walls 942 and a top 944 which define an open-bottomed chamber to receive a battery pack 900. The top 944 comprises one or more holes 948 to receive the alignment pins 924 and one or more locking components 946 to receive the locking anchors 930 on the battery pack.

FIG. 9E is a schematic, perspective view of a locking anchor 930 and a locking component 946, according to embodiments. Referring briefly to FIG. 9E, the locking anchor 930 may be coupled to the locking component 946, the jaws 948 of which close and lock onto the locking anchor 930. When the engagement/disengagement button 950 is depressed the jaws release the locking anchor 930.

Figure 10:
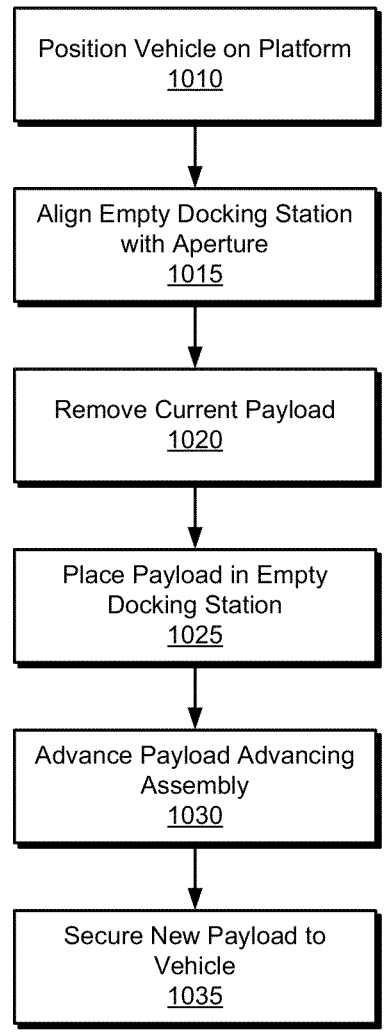
FIG. 10 is a flowchart illustrating operations in a method to replace a payload on a vehicle, according to embodiments.

Having described various structural components of an example vehicle base station, methods of using such a base station will now be describe. In some embodiments a vehicle base station as described herein may be used to implement a method to replace a payload 840 on a vehicle 830, which will be described with reference to FIG. 10.

In use, a vehicle such as vehicle 830 is positioned (operation 1010) on the platform 820 of the housing 810. In the case of an airborne vehicle such as a UAV or an MAV, the airborne vehicle may be landed directly on the platform. Alternatively, the airborne vehicle may be landed elsewhere and manually positioned on the platform 820. In the case of a land-based vehicle the vehicle may be driven directly onto the platform 820 or may be driven near the platform then manually positioned on the platform 820.

When the vehicle 830 is positioned on the platform the alignment assembly 850 may be activated to align the payload 840 over the aperture 822 in the platform 820. In the embodiment depicted in FIG. 8A the electromagnetic pads 850 may be activated to position and secure the vehicle 830 over the aperture 822 in the platform 820.

At operation 1015 an empty docking station is aligned with the aperture 822 in the platform 820. In the embodiment depicted in FIGS. 8A and 8B, the rotating turntable 872 may be advanced such that an empty docking station 874 is beneath the aperture 822 in the platform. When the rotating turntable is in this position the payload platform 864 is positioned underneath the empty docking station.

At operation 1020 the first payload 840 is removed from the vehicle 830. In the embodiment depicted in FIGS. 8A and 8B the hoist assembly 862 raises the payload platform 864 through the empty docking station 874 in the turntable 872 such that the payload platform 864 contacts the payload 840 on the vehicle. In embodiments in which the payload comprises a modular battery case 900 as described with reference to FIGS. 9A-9E the payload platform 864 applies pressure to the modular battery case 900, which cases the locking anchor 930 to depress the engagement/disengagement button 950 on the locking component 946. This, in turn, causes the jaws 948 of the locking component to release the locking anchor 930, thereby automatically releasing the payload 840 from the vehicle. The payload 830 then rests on the payload platform 864.

At operation 1025 the payload 840 removed from the vehicle in operation 1020 is placed in an empty docking station 874. In the embodiment depicted in FIGS. 8A and 8B the hoist assembly 862 lowers the payload platform 864 through the empty docking station 874 in the turntable 872. In some embodiments the modular battery case 900 is dimensioned such that it is smaller than the aperture in the empty docking station 874, such that the modular battery case passes through the aperture in the empty docking station.

At operation 1030 the payload advancing assembly is advanced to position a new payload 840 in the aperture 822 beneath the vehicle 830 on the platform 820. In the embodiment depicted in FIGS. 8A and 8B the turntable 872 is rotated to position a new payload 840 in the aperture 822 beneath the vehicle 830.

At operation 1035 the new payload is secured to the vehicle. In the embodiment depicted in FIGS. 8A and 8B the hoist assembly raises the payload platform 864 through the docking station 874 in the turntable 872 such that the payload is lifted off the payload platform 864 and up to the vehicle 830. In embodiments in which the payload comprises a modular battery case 900 as described with reference to FIGS. 9A-9E the payload platform 864 applies pressure to the modular battery case 900, which causes the locking anchor 930 to depress the engagement/disengagement button 950 on the locking component 946. This, in turn, causes the jaws 948 of the locking component to lock onto the locking anchor 930, thereby automatically securing the payload 840 to the vehicle 830. The payload platform 864 may then be lowered back through the docking station 874 in the turntable 872.

As described above, in some embodiments the payload 840 may comprise at least one battery. In such embodiments the base station 800 may comprise, or be coupled to, a battery charging station to recharge batteries removed from the vehicle 830. By way of example and not limitation in some embodiments the docking stations 874 in the turntable 872 may comprise a battery charging terminal such that batteries stored in the docking stations 874 are charged. In such embodiments the modular battery case 900 is larger than the aperture in the empty docking station 874, such that the modular battery case 900 is positioned in docking station 874 on the turntable 872 when the payload platform 846 drops through the aperture in the empty docking station 874. The battery may then be charged while it is positioned in the docking station 874.

Thus, described herein are exemplary embodiments of a vehicle loading station and associated methods for using a vehicle loading station. In some embodiments the vehicle loading station comprises a housing which defines at least one platform onto which a vehicle carrying a payload may be positioned. A vehicle docking assembly docks and secures the vehicle on the platform. A payload replacement assembly removes a payload from the vehicle and replaced with a new payload.

In some embodiments the payload 840 may comprise one or more batteries. In other embodiments the payload 840 may comprise a transport payload, e.g., materials or goods. In other embodiments the payload 840 may comprise a dispensable payload such as water or a fire suppressant.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system, comprising:
    a vehicle base station on which a vehicle may be positioned;
    a modular battery case, comprising:
        a housing comprising a lower portion and an upper portion defining a chamber capable of holding one or more batteries;
        at least one alignment pin extending from an upper surface of the upper portion of the housing to facilitate appropriate alignment of the modular battery case with a battery receptacle on the vehicle, the battery receptacle comprising at least one locking component, the locking component comprising opposing jaws; and
        at least one locking anchor extending from the upper surface of the upper portion of the housing and positioned to be received by the locking component when the modular battery case is inserted into the battery receptacle, wherein the opposing jaws are operable to close and lock onto the at least one locking anchor; and
    an assembly to autonomously load and unload the modular battery case from the vehicle.

2. The system of claim 1, wherein the vehicle base station, comprises:
    a second housing defining at least one platform to support the vehicle;
    a vehicle docking assembly to align a payload carried by the vehicle at a location on the at least one platform; and
    a payload replacement assembly to remove the payload from the vehicle and to replace the payload with a new payload.

3. The system of claim 2, further comprising a battery recharging assembly to recharge the one or more batteries.

4. The system of claim 2, wherein the at least one locking component further comprises a disengagement button disposed between the opposing jaws which, when depressed, causes the opposing jaws to disengage the at least one locking anchor.

5. The system of claim 4, wherein the payload replacement assembly activates the disengagement button to release the modular battery case from the battery receptacle.

6. The system of claim 5, wherein the payload replacement assembly applies pressure to the modular battery case, thereby causing the at least one locking anchor to depress the disengagement button to release the modular battery case from the battery receptacle.

7. The system of claim 4, wherein the modular battery case fits a variety of battery types.

8. The system of claim 2, wherein the payload replacement assembly comprises a hoist assembly comprising a payload platform moveable between a first position in which the payload platform is displaced from the payload carried by the vehicle to a second position in which the payload platform contacts the payload.

9. The system of claim 8, further comprising a payload advancing assembly to advance the payload into a third position from which the hoist assembly can secure the payload to the vehicle.

10. The system of claim 9, wherein:
the at least one platform comprises at least one aperture;
the payload advancing assembly comprises a rotatable turntable positioned beneath the at least one platform;
the rotating turntable comprises a plurality of docking stations, each docking station defining a first aperture; and
the hoist assembly configured to extend the payload platform through a second aperture in the turntable and through the at least one aperture in the at least one platform to contact the payload on the vehicle.

11. The system of claim 10, wherein the docking stations on the rotating turntable comprise a battery charging subsystem.

12. The system of claim 2, wherein the vehicle docking assembly comprises an alignment mechanism to align the vehicle in a predetermined position on the platform.

13. The system of claim 12, wherein the alignment mechanism comprises at least one electromagnet positioned on the platform.

14. The system of claim 1, wherein the battery receptacle fits heterogeneous vehicles including aircraft and ground vehicles.

* * * * *